(12) United States Patent
Balk et al.

(10) Patent No.: US 7,128,202 B2
(45) Date of Patent: Oct. 31, 2006

(54) APPARATUS AND TRANSPORT CONTAINER FOR TRANSPORT AND CONTROLLER DISCHARGE OF A LOAD

(75) Inventors: Wouter Balk, Baarn (NL); Jozef Walter Maria Hopman, Weesp (NL)

(73) Assignee: Eurosport B.V., Weesp (NL)

( * ) Notice: Subject to any disclaimer, the term of this patent is extended or adjusted under 35 U.S.C. 154(b) by 0 days.

(21) Appl. No.: 10/495,799

(22) PCT Filed: Nov. 15, 2002

(86) PCT No.: PCT/NL02/00745

§ 371 (c)(1),
(2), (4) Date: Oct. 15, 2004

(87) PCT Pub. No.: WO03/042080

PCT Pub. Date: May 22, 2003

(65) Prior Publication Data

US 2005/0061614 A1 Mar. 24, 2005

(30) Foreign Application Priority Data

Nov. 15, 2001 (NL) ................................. 1019372

(51) Int. Cl.
 *B65G 17/36* (2006.01)
 *B65G 47/40* (2006.01)
(52) U.S. Cl. .................................. 198/704; 198/370.05
(58) Field of Classification Search ........... 198/370.05, 198/370.04, 704
See application file for complete search history.

(56) References Cited

U.S. PATENT DOCUMENTS 2,595,689 A * 5/1952 Mitchell ..................... 198/704
3,086,636 A * 4/1963 Raynor ........................ 198/531
3,296,954 A * 1/1967 Haub et al. .................... 99/404
3,300,027 A * 1/1967 Booij .......................... 198/704
3,817,369 A * 6/1974 Bluthardt et al. ......... 198/347.4
4,892,185 A * 1/1990 Guardiola ................. 198/477.1
5,346,052 A * 9/1994 Fox ............................. 198/350
5,842,556 A * 12/1998 van Hattum ........... 198/370.05

FOREIGN PATENT DOCUMENTS

| GB | 693 365 | 7/1953 |
| NL | 9 001 116 | 12/1991 |
| NL | 9 400 388 | 10/1995 |

* cited by examiner

*Primary Examiner*—Gene O. Crawford
*Assistant Examiner*—Mark A. Deuble
(74) *Attorney, Agent, or Firm*—Young & Thompson (57) ABSTRACT

An apparatus includes a frame with a guide for at least one displaceable transport container, a drive element for carrying the container in an endless track, a resetting device for placing a container in a starting position and a discharge station for selectively relieving a container of a load. The containers are provided with a movable carrying panel for receiving the load, including at least two tilt trays which extend between tilt axes located on both sides. The trays can be selectively titled between a transporting position and a discharge position, and are provided with a locking mechanism for locking the trays in the transport position. The resetting device is adapted to co-act with a passing opened container to place the trays thereof in the transport position, and the discharge station is able to selectively unlock the locking mechanism of a passing transport container to thus release the trays.

16 Claims, 6 Drawing Sheets

APPARATUS AND TRANSPORT CONTAINER FOR TRANSPORT AND CONTROLLER DISCHARGE OF A LOAD

BACKGROUND OF THE INVENTION

The present invention relates to an apparatus for transport and controlled discharge of a load, comprising a frame with a guide for at least one displaceable transport container, a drive means for carrying the transport container in an endless track, a resetting device for placing a transport container in a starting position and a discharge station for selectively receiving a load of a transport container, wherein the transport containers are provided with a movable carrying panel for receiving of the load thereon, comprising at least a first and a second tilt tray which extend between tilt axes located on both sides and which can be selectively tilted between a transporting position and a downward hanging discharge position.

Such an apparatus is applied in particular as sorting device for goods in distribution centres, mail order companies and production environments where different products have to be brought together per (dispatch) destination. The goods for sorting can per se be of many types but particularly comprise books, magazines, items of clothing and other articles with a significant own weight. The apparatus herein normally comprises a connected series of a few dozen to a few hundred transport containers in accordance with the desired sorting capacity. Per discharge station a dispatch box or other receiving means can be placed in which the goods are received per destination. The goods are supplied from a loading station to the transport containers in a sequence which is in principle random and identified manually or otherwise. The drive means carries the transport containers around the track at a relatively high speed, wherein at a certain moment a transport container will pass the discharge station for which the carried product is intended. Having arrived there, an electronic control of the apparatus sets means of the discharge station into operation which are able to actuate the locking mechanism of the transport container and thus release the tilt trays. Under the influence of the force of gravity the tilt trays drop open almost immediately and thus discharge the product into the waiting dispatch box or the like. The transport container then passes over the resetting device, wherein the two tilt trays are closed and the transport container is returned to its starting position, ready for a subsequent lap. Products can thus be distributed over the different discharge stations with a relatively large sorting capacity.

A known apparatus of the type indicated in the preamble is described in a Netherlands patent application made open to public inspection under number 9001116. The known apparatus comprises a drive means in the form of an endless chain to which is coupled a number of transport containers. These latter each comprise a carrying panel for receiving a load thereon consisting of two tilt trays tilting in opposite directions. The one tilt tray herein rests with an edge on the other tilt tray which is provided with a locking mechanism to retain this transporting position. If the locking mechanism is actuated at a discharge station by a solenoid disposed there along the transport path, the locking of the tilt trays is released and they both swing open in downward direction and so lose their load. This whole process takes place between entering and exiting the discharge station so that the load is discharged at the relevant discharge station. Having arrived at the resetting device, the foremost tilt tray as seen in the transport direction is co-displaced and raised by a closing profile, while the other tilt tray is provided diametrically of the tilt axis with an operating member which strikes against a stop disposed close to the track to thus also close this tilt tray and restore the locking.

In order to increase the sorting capacity of the apparatus it is the object in the first place to increase the transport speed. This means that in each of the discharge stations there is very little time available to discharge the collected goods, and that it must also be possible to close the transport container in a very short time. A relatively high own weight of the tilt trays enhances a rapid and reliable unloading, but also ensures that the tilt trays open with rather great force and then continue to swing for a time, whereby additional wear occurs. In the case of the resetting device it is important that the tilt trays are returned to the transporting position in the correct sequence, since otherwise the locking mechanism will not be able to keep the transport container closed. Particularly the protruding operating member of the rear tilt tray is an element susceptible to malfunction here. If this member is not adequately accessible, for instance because a product such as an item of clothing becomes caught thereon during a lap, the transport container will not close.

SUMMARY OF THE INVENTION

The present invention has for its object, among others, to provide an apparatus of the type stated in the preamble with which at least some of these drawbacks are not associated, or at least to a lesser extent.

In order to achieve the stated object, an apparatus of the type stated in the preamble has the feature according to the invention that between the tilt trays a coupling is arranged which is able and adapted to impose a tilting movement of the first tilt tray on the second tilt tray. Owing to the mutual coupling of the two tilt trays, continued swinging of the trays is limited because the one tray prevents swinging of the other and vice versa Closing of one of the two trays will moreover also result in closing of the other. A protruding operating member, as in the known apparatus, can therefore be omitted. It suffices to close the foremost tilt tray, wherein the coupled rear tilt tray is also co-displaced synchronously to the transport position. Timing problems, such as could occur in the known apparatus, do not present themselves here because the coupling of the two trays will always impose the correct closing sequence. The apparatus thus gains not only ergonomically but also in reliability and durability.

In a particular embodiment the apparatus according to the invention is characterized in that the coupling comprises a coupling rod which is connected to both tilt trays for pivoting eccentrically relative to the tilt axes. Such a coupling rod extends from a position at an angle below the one tilt axis to a position at an angle above the other and transmits a movement of the one tilt tray to the other and vice versa, so that both movements proceed wholly synchronously. A further particular embodiment of the invention has the feature that the mutual coupling of the tilt trays takes an asymmetrical form. Making use of a coupling by means of a coupling rod, such an asymmetrical coupling comprises for instance a mounting of the coupling rod more eccentrically on the one tilt tray than on the other. As a consequence of such an asymmetrical coupling the two tilt trays swing open with a differing, greater or lesser swing and take up a different balanced position, thereby achieving an exceptionally effective damping of the trays on each other.

Although the mutual coupling of the two tilt trays limits the swing thereof and particularly the continued swinging thereof, both tilt trays will nevertheless swing open with relatively great force to enable the load to be discharged in a short time. In order to limit the resulting noise production and possible wear, a preferred embodiment of the apparatus according to the invention has the feature that the tilting movement between the transport position and the discharge position is at least partly controlled in the case of at least one of the tilt trays by a damping body. The damping body herein reduces the impact which the tilt tray otherwise makes after opening under the influence of its own weight and its load. Although such a damping body can be applied with both tilt trays, a single body will suffice because of the invention since the damping of one of the trays is always transmitted to the other owing to the mutual coupling. In a more particular embodiment the apparatus according to the invention herein has the feature that the damping body comprises a shock absorber against which the tilt tray strikes in the discharge position. Such a damper very effectively suppresses the noise production of the tilt trays without otherwise slowing the stroke thereof.

A modification of one of the trays not only suffices for the purpose of damping, the closing of the transport container can be wholly effected via only one of the trays. In a particular embodiment the apparatus according to the invention has for this purpose the feature that the resetting device comprises a closing guide which, as an opened transport container passes, strikes against at least one of the tilt trays thereof and approaches the tilt axis thereof. As it approaches the tilt axis, the closing guide carries the tilt tray along with it and gradually closes it until the transport position is reached. Owing to the mutual coupling of the two tilt trays, the other tray is herein also co-displaced to the transport position. An operating member, which protrudes at the top of an open transport container as in the known apparatus, can in particular be hereby avoided.

The relative timing during closing of the tilt trays can also be fully controlled in the apparatus according to the invention by the synchronization produced by the mutual coupling. Another consideration here is that the locking of one of the tilt trays also entails a fixation of the other due to the mutual coupling between the tilt trays. In a further particular embodiment the apparatus according to the invention therefore has the feature that the locking mechanism is arranged on an underside of the transport container and co-acts with at least one of the tilt trays. Owing particularly to the coupling of the two tilt trays and the thereby imposed fixation of the other tilt tray, no overlap of the two tilt trays is necessary. A further particular embodiment of the apparatus according to the invention therefore has the feature that the tilt trays retain a certain mutual interspacing. Owing to this interspacing it is possible to avoid the trays striking against each other during closing of the transport container, with all the noise production this entails. The apparatus is quieter as a result.

BRIEF DESCRIPTION OF THE DRAWINGS

The invention also relates to a transport container for use in the above described apparatus and will now be further elucidated with reference to an embodiment and an associated drawing. In the drawing.

The figures are purely schematic and not drawn to scale. Some dimensions in particular are shown highly exaggerated for the sake of clarity. Corresponding parts are designated as far as possible in the figures with the same reference numeral.

DESCRIPTION OF THE PREFERRED EMBODIMENTS

Figures 1, 2:
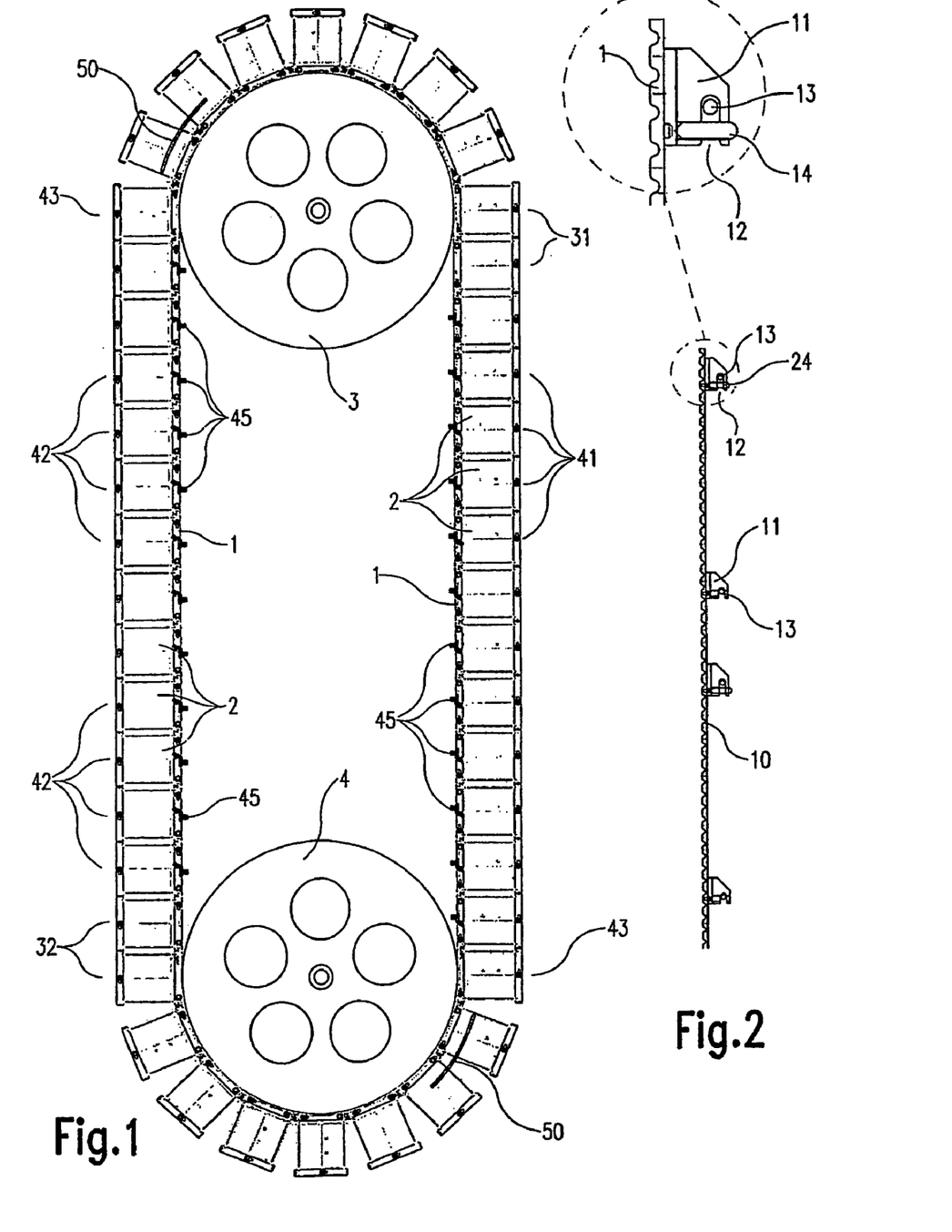
FIG. 1 shows a top view of an embodiment of an apparatus according to the invention.
FIG. 2 shows a partly detailed longitudinal section of a transport means as applied in the apparatus of FIG. 1.

FIG. 1 shows in partial top view an embodiment of an apparatus for transport and controlled discharge of products according to the invention. This is a sorting device, usually designated a bomb-bay sorter, for sorting books and magazines per destination and herein distributing them over dispatch boxes for the various destinations. The apparatus can however also be employed instead for sorting and distributing textile goods and other distribution goods. The apparatus is constructed around a fixedly disposed frame (not shown) and comprises a drive means in the form of an endless belt 1 to which is coupled a series of separate transport containers 2. Transport containers 2 comprise separate carriages and are each able to receive a load and discharge it selectively at the intended location. Belt 1 runs through a closed track over two revolving wheels 3,4 arranged on the outer sides of the frame. One of the revolving wheels 3 is herein driven by a suitable electric motor or in other manner at a speed which can rise to about 5–20 revolutions per minute, while the other wheel 4 is free-running. The transport containers are thus co-displaced at a speed of about 0.5–2.5 meters per second in a track imposed by belt 1. The number of transport containers in large measure determines the sorting capacity of the apparatus and can increase in practice to about 300 units or even more, wherein the length of the apparatus exceeds 90 meters. Belt 1 is manufactured from a tough plastic such as polyethylene and reinforced with steel wires so as to be able to exert sufficient tensile force on the entirety of transport containers 2 during operation. Instead of a belt it is otherwise also possible to opt if desired for another type of endless drive means, such as for instance a chain or a (steel) cable, although, other than a chain, a belt requires no maintenance, or hardly any. A belt drive thus has no stretch which makes continuous re-tensioning necessary, nor does the belt require lubrication, so that the drive means remains relatively clean and contamination of the transported goods in particular is avoided. A belt drive is moreover quieter and provides the whole with more stability. The transport containers can thereby be given a wider and larger form while retaining stability and reliability, and are herein able to transport a heavier load.

Transport containers 2 are coupled to belt 1 by means of an easily and manually releasable rapid-action coupling. For this purpose the belt 1, see FIG. 2, is provided at regular intervals with rapid-action coupling members 11, which each comprise a cup 12 for receiving therein a shank of a bolt 13 or other coupling member of transport container 2. Transport containers 2 therefore each hook with a set of bolts 13 into a set of rapid-action coupling members 11, so that during operation they are pulled forward on bolts 13 by the rapid-action coupling members 11. A locking pin or other securing means 14 which confines bolt 13 in cup 12 herein avoids the possibility of the transport containers 2 becoming detached when the apparatus stops, whether or not abruptly. Owing to such a rapid-action coupling in combination with the free support of transport containers 2, these latter can be quickly and easily removed from or re-placed in the apparatus at any desired moment. The period of time for which the apparatus is non-operational during maintenance or change-over operations can thus be significantly limited.

Figure 3:
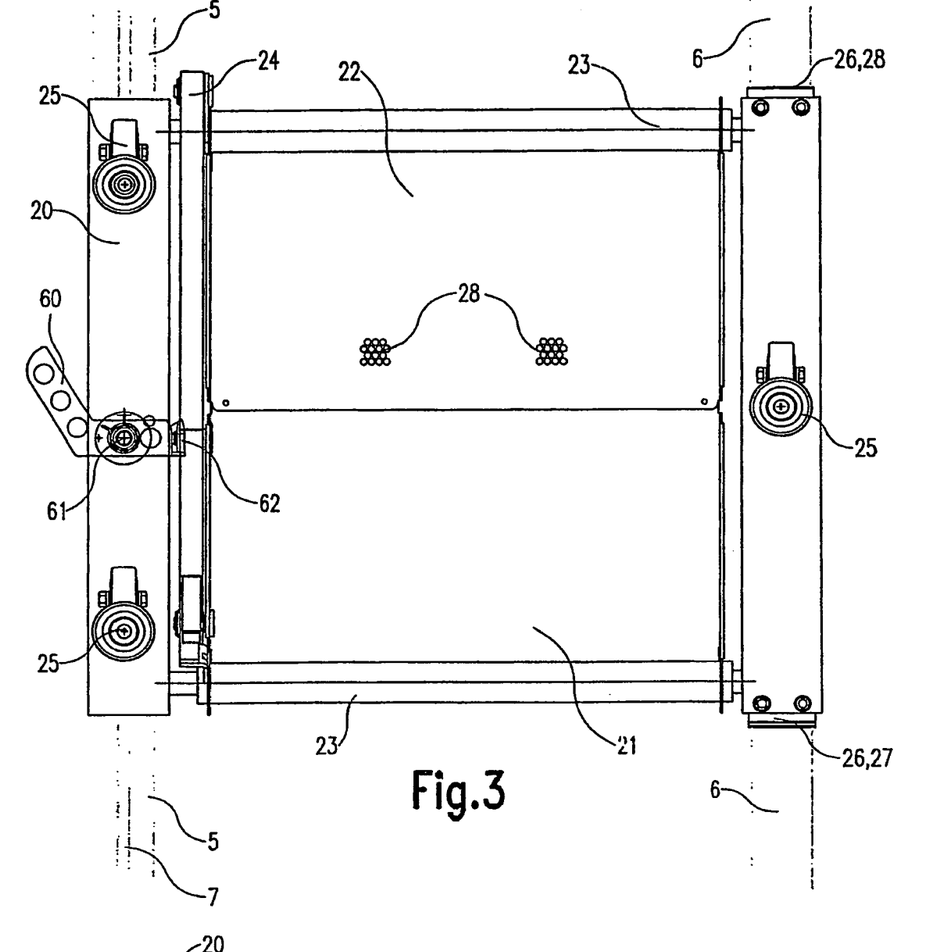
FIG. 3 is a top view of a transport container as applied in the apparatus of FIG. 1.
Figure 4:
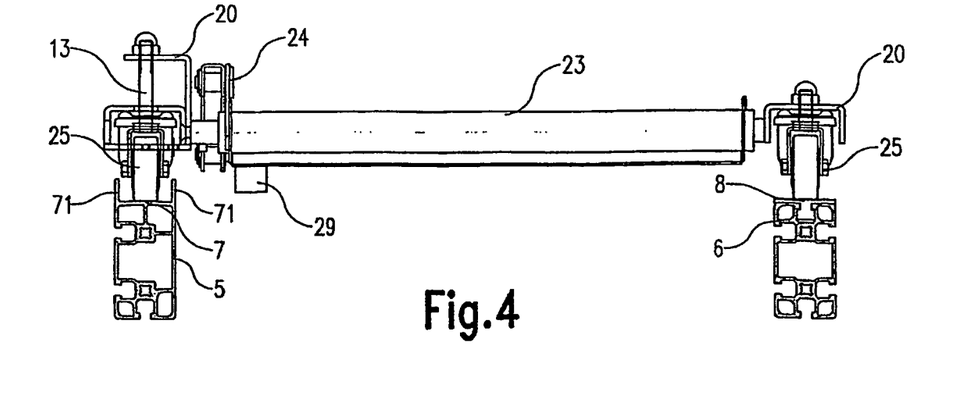
FIG. 4 shows a cross-section of the transport container of FIG. 3 resting on a guide of the apparatus of FIG. 1.
Figure 8:
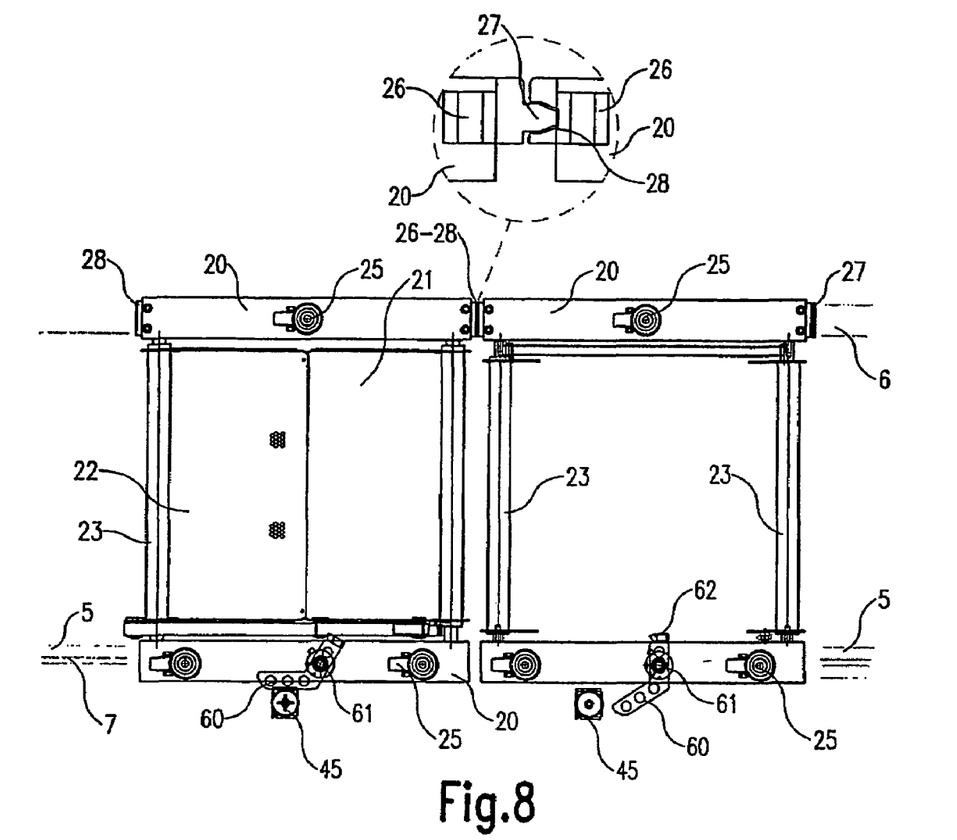
FIG. 8 shows a top view of two transport containers of FIG. 3 in mutually coupled situation.
Figure 9A:
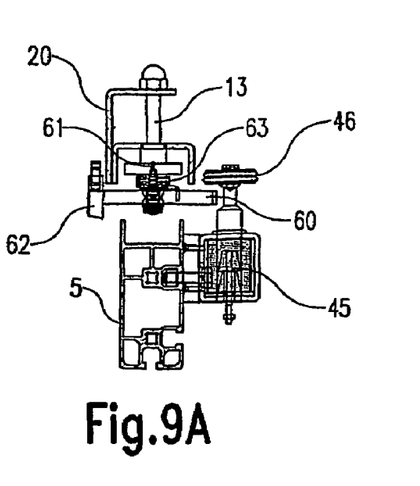
FIGS. 9A–B show a cross-section of an actuator as applied in the apparatus of FIG. 1 in respectively a free and actuated position.
Figure 9B:
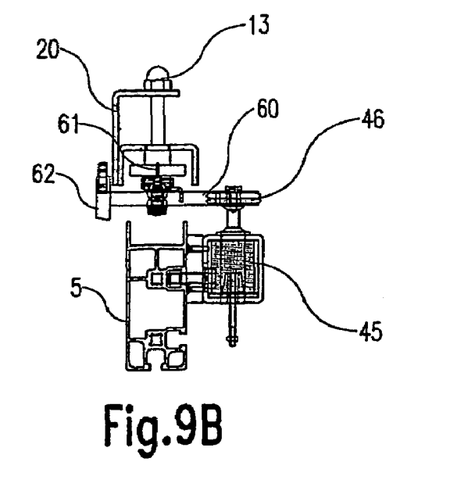

The transport containers each comprise, see FIGS. 3 and 4, two relatively heavy longitudinal profiles 20 having therebetween a controllable carrying panel 21,22 for receiving thereon of a load for transporting. This carrying panel is formed here by a first tilt tray 21 and a second tilt tray 22 which extend between tilt axes 23 located on either side thereof In this embodiment the tilt trays 21,22 are connected fixedly to the tilt axes, wherein the tilt axes are in turn bearing-mounted in the longitudinal profiles. Tilt trays 21,22 are thus selectively tiltable on the respective tilt axes 23 between a substantially horizontal transporting position as shown in FIGS. 3 and 4, and a downward hanging discharge position as shown in FIGS. 8 and 9.

A locking mechanism fixes both trays 21,22 in the transporting position. This locking mechanism here comprises a lock 60 arranged resiliently via a torsion spring 63 on a rotation axis 61. In the balanced state shown in FIG. 3, lock 60 engages with a protrusion 62 under one of the tilt trays 21 to prevent tilting thereof. By moving lock 60 clockwise out of the balanced state counter to the spring tension the protrusion 62 is removed from under tilt trays 21,22 and these are released, so that under the influence of their own weight and that of a load possibly resting thereon they swing open in downward direction. If desired, a bias or other power assistance can herein be applied to enhance opening of the tilt trays 21,22.

Tilt trays 21,22 are mutually coupled in order to synchronize their tilting movements. In this embodiment this coupling comprises a coupling rod 24 which is mounted on both tilt trays for pivoting eccentrically relative to their respective tilt axes, see FIGS. 3, 5 and 6. Instead of a free, independent drop of the two tilt trays 21,22, the movement of the one tilt tray is now imposed wholly by the other, and vice versa. Owing to this coupling it suffices to fix only one of the two tilt trays 21,22 in transporting position. The mutual coupling ensures that the other tray also remains closed. An overlap of the edges of the two tilt trays, as shown and as necessary in many existing apparatuses, can strictly speaking then be dispensed with, which results in a lower noise production when the transport container is closed.

Figure 5:
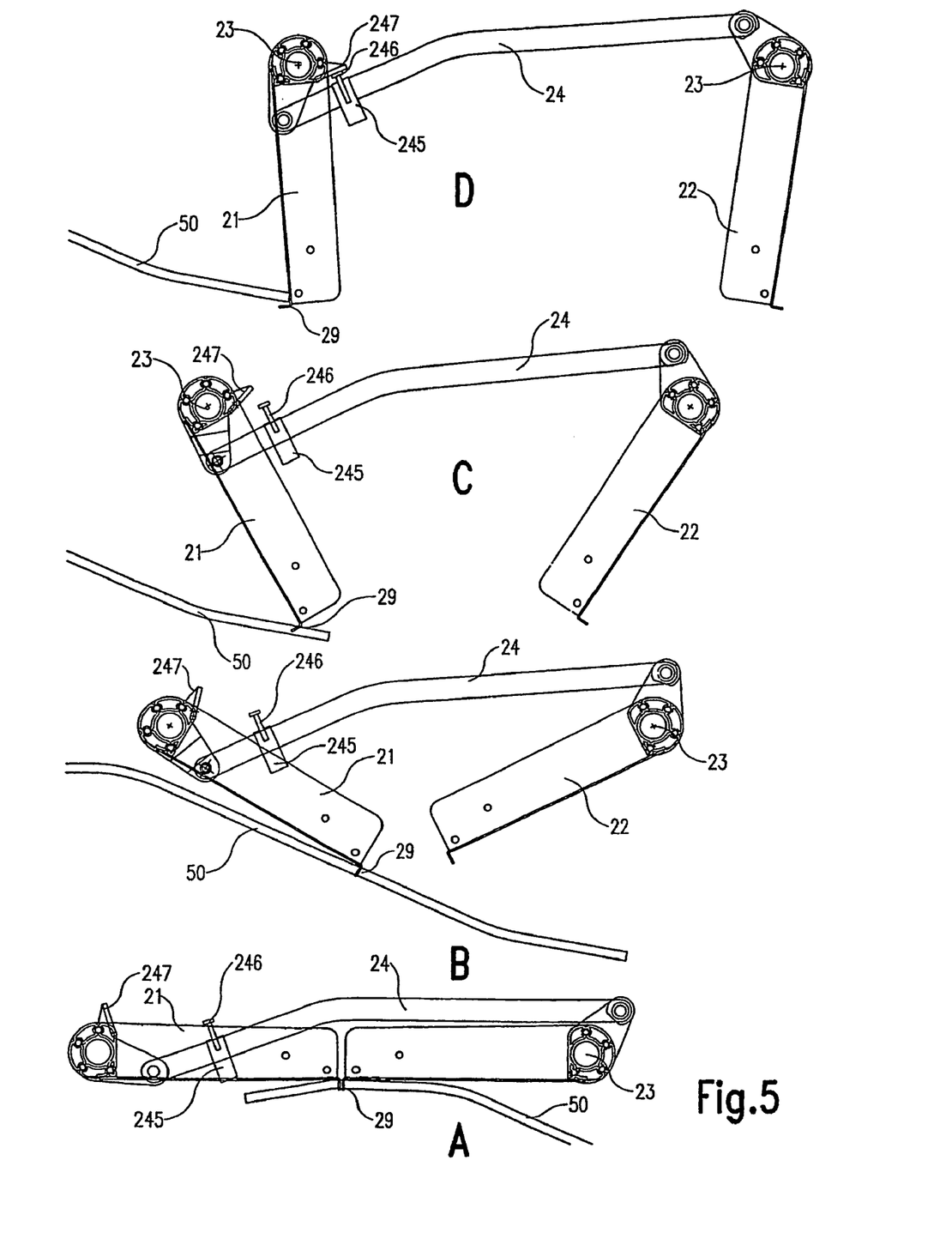
FIG. 5 shows schematically the transport container of FIGS. 3 and 4 at different stages of the closing thereof.
Figure 6:
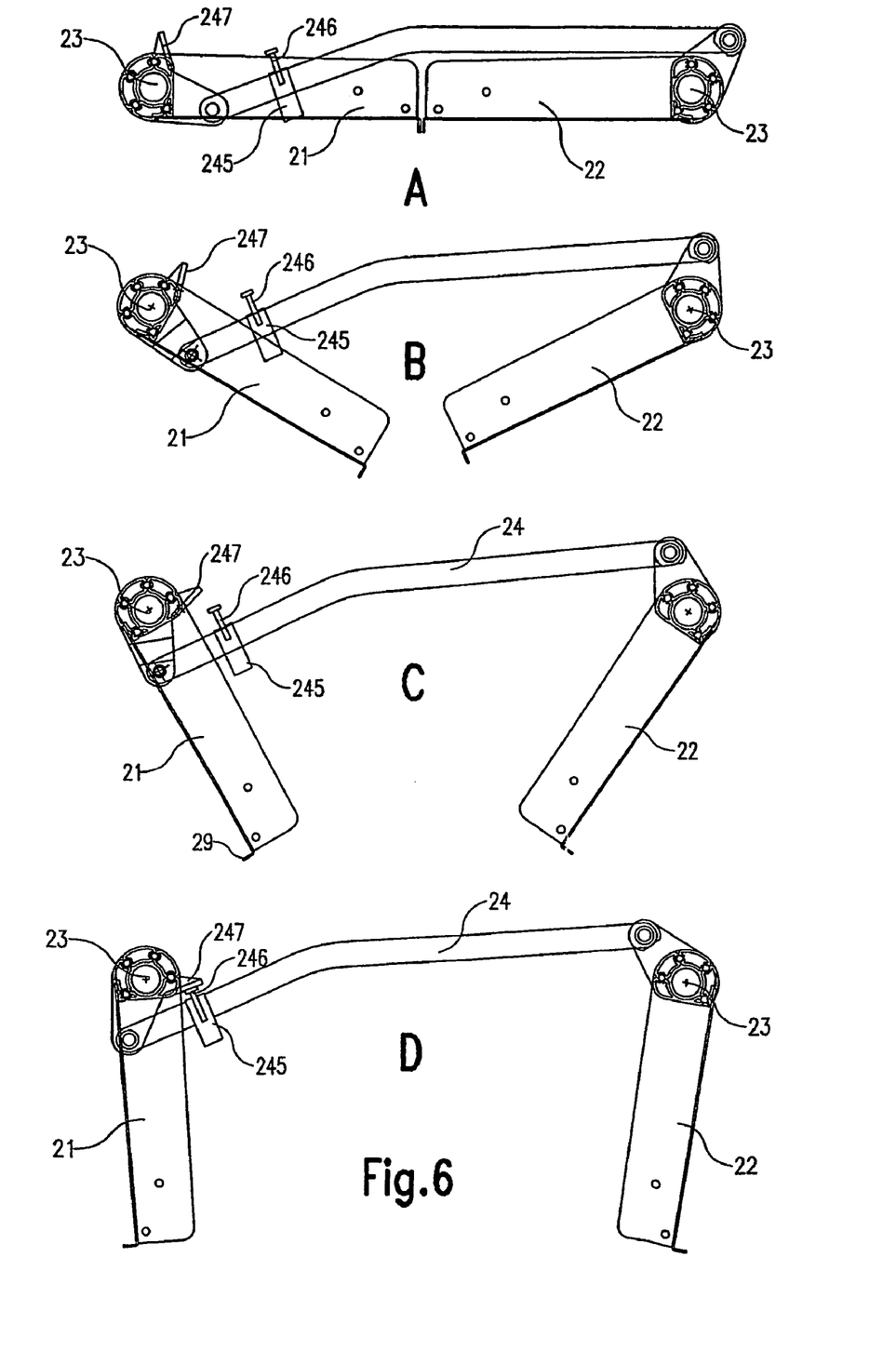
FIG. 6 shows schematically the operation of the transport container of FIGS. 3 and 4 at different stages of the discharge of a possible load.

It is also sufficient to close only one of the two tilt trays in order to return the whole transport container to the closed transporting position. The other tray will after all follow the closing movement of this tray. As shown in FIG. 5, advantageous use is made hereof in the present invention. During its movement through a resetting device the opened transport container 2 is guided against a closing guide 50 by a stop protrusion 29 provided thereon for this purpose, stage D. The closing guide comprises a profile which, as seen in the direction of transport, gradually approaches the path and thereby the tilt axes 23 of transport container 2. The foremost first tilt tray 21 is thus raised increasingly further, stages C and B, wherein the rear second tilt tray 22 follows, urged to do so by coupling rod 24. A separate operating member protruding inconveniently at the top of transport container 2 can thus be omitted. One of the two tilt trays eventually presses the lock 60, not further shown in FIG. 5, out of its balanced state and then causes it to snap thereunder. Transport container 2 is now situated again in the closed starting position A and is again able to receive a load.

In addition to this and more advantages of more or less structural nature, the mutual coupling of tilt trays 21,22 provides a damping when they swing open, whereby continued swinging thereof is counteracted. This swinging must be avoided as far as possible since it could otherwise adversely interfere with an undisturbed drop of the load out of the transport container, and moreover result in a shorter lifespan of the tilt trays and tilt shafts. In the present embodiment the coupling takes a symmetrical form, whereby both tilt trays 21,22 make the same, albeit opposing, stroke from the transporting position A, see FIG. 6, via a number of intermediate stages B,C to the final downward hanging discharge position D. Instead of such a symmetrical coupling, it is also possible to opt for an asymmetrical coupling which results in a different distribution of the total stroke over the two trays. Using a coupling rod 24 this can for instance be realized by mounting this rod more or less eccentrically at the one tilt tray than at the other. Particularly such an asymmetrical coupling, wherein the two tilt trays make an unequal stroke and their tilting thereby goes out of phase, is able to avoid continued swinging of the trays to a great height. Various aspects are advantageously realized here such that the rear tilt tray 22 makes a tilt angle of more than 90°, while the foremost tray 21 executes a correspondingly smaller tilt angle. The rear tilt tray thus pivots beyond a vertical position, while the foremost remains slightly inclined to the rear. Thus avoided is the possibility of the discharged load striking against the rear tilt tray during its fall, while the foremost tilt tray of the advancing transport container is moving away from the load during this fall and will do no worse than guide the load in the desired direction.

In order to contain the sound level of the apparatus and have the tilt trays make a good, controlled stroke, the product holders are provided with damping means which control at least a part of the stroke of tilt trays 21,22. Continued swinging of the tilt trays after they have fallen open and the load resulting from an impact otherwise occurring here is thus effectively prevented. In this embodiment, see FIG. 6 in particular, the damping means comprise a damping body in the form of a high-grade shock absorber 245 which can strike with a damped damping rod 246 against a stop 247 provided for this purpose on the foremost tilt tray 21. The shock absorber is herein mounted in coupling rod 24 such that damping rod 246 comes into contact with stop 247 in the final part of the path of tilt trays 21,22. Tilt trays 21,22 hereby come to rest in controlled manner, while opening thereof is not otherwise slowed or impeded. Because the damping of the one tilt tray 21 is imposed on the other tilt tray 22 via the mutual coupling 24 of trays 21,22, only one such shock absorber 245 or other damping body is sufficient for damping both trays 21,22. This results in a significant cost-saving.

Freely rotating castors 25 are arranged in both longitudinal profiles 20 of product containers 2. Particularly the wheel arranged on the outside in the middle of the transport container can optionally take a fixed instead of swivelling form, although a setup with only castors provides the transport containers with the greatest possible maneuverability. Product containers 2 run with these castors 25 over a guide 5,6 arranged on the frame and are thus supported fully on both sides in all parts of the track. The guide is shown separately in FIG. 7 and comprises two straight rails 5,6 which connect close-fittingly onto substantially flat tables 9 on the end surfaces of the apparatus. In all parts of the track the guide 5,6,9 thus provides on both sides of product containers 2 a support surface for receiving thereon the castors 25 of the transport containers. The support surface provided by the innermost 5 of the two rails 5,6 is herein provided in transverse direction, see FIG. 4, with a slight convexity 7 for receiving on an apex thereof a running surface of the castors 25 on this side of transport container 2. As a consequence a perfectly straight tracking of transport containers is obtained and transverse movements of the transport containers are limited to a minimum. Furthermore, drive belt 1 is thus substantially only under strain of tension for which the belt is designed. The other of the two rails 6 provides a flat support surface 8 and serves only to support the already tracking product containers 2.

Figure 7:
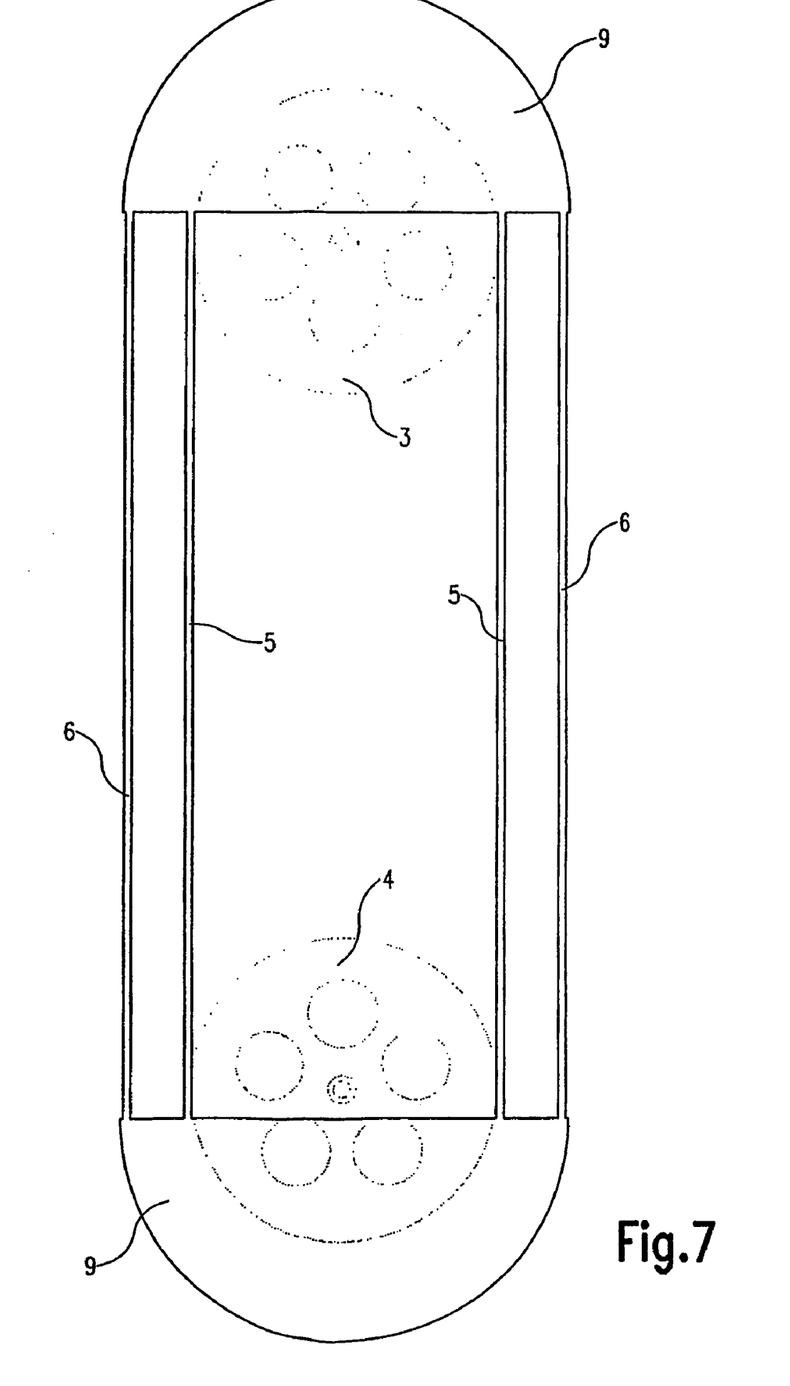
FIG. 7 shows schematically the guiding of the transport containers in the apparatus of FIG. 1.

With an eye to an unexpectedly occurring, extremely great action of transverse forces, the support surface 7 of at least one of the two rails 5,6 is arranged in the bottom of a u-shaped profile, so that the flanks 71 thereof provide an extra certainty against derailment of the transport containers in this part of the track. Both rails 5,6 comprise in this embodiment extrusion profiles formed from aluminum, although use can be made instead of other materials and manufacturing methods. In the bends of the track the product containers 2 can in principle travel freely over tables 9, thereby held in their path by drive belt 1. Because drive belt 1 here lies tightly over a revolving wheel 3,4, it can withstand a relatively large transverse load in the bends and the lateral tolerance of transport containers 2 is minimal here. Castors 25 herein ensure a smooth travel of transport containers 2 through the bends.

As can be seen in the top view of FIG. 1, the transport containers 2 spread apart in the bends and draw closer together again after a bend in the straight part of the track. In order to enhance the tracking of the whole here, the separate transport containers are provided on the side remote from drive belt 1 with coupling members 26 which mutually co-act in the straight part of the track to bring about an engagement between successive transport containers. Coupling members 26, see FIG. 8, comprise plastic parts arranged on the end surfaces of transport containers 2. The coupling members herein comprise in each case a transverse rib 27 on the one transport container which is received loosely in an almost complimentarily formed transverse groove 28 on the adjoining side of the subsequent transport container. In addition to a fixation in vertical direction, coupling members 26 also provide a relatively soft bumper to absorb and damp mutual collisions of transport containers. If desired, this action can be enhanced by giving the coupling members a resilient or (gas-)damped form. As a result of the thus present engagement, transport containers 2 behave in the straight part of the track as a coherent whole, wherein a lateral tolerance is allowed to maintain a tracking freedom of wheels 25 of the separate transport containers 2. If desired, similar coupling members 26 can also be used on the belt side of transport containers 2 to further strengthen the engagement between transport containers 2 and to have it come into effect earlier after leaving a bend.

In the shown configuration the apparatus comprises two series of individually controllable discharge stations 41,42, each with an associated loading station 31,32 respectively, see FIG. 1. At the position of a loading station 31,32 products are placed, optionally manually, in transport containers 2, while in discharge stations 41,42 dispatch boxes are disposed under transport containers 2 to receive products for a specific destination. A choice has been made in this embodiment for diametrically opposite loading stations 31,32 extending over two transport containers 2. It is also possible to opt instead for a single loading station which can if desired extend over a greater or lesser number of transport containers in order to increase the number of different destinations which can be served in one lap of the apparatus. The advantage of the shown configuration, wherein loading stations 31,32 are provided just after a bend in the track and the associated discharge stations 41,42 respectively are all disposed in a straight path before the other bend, is however that products herein never have to be co-displaced in a bend. After a bend the products come to lie in a product container and have in principle been discharged, before the following bend, at the intended location in one of the discharge stations. Thus is avoided that the products lying loosely in the product container are subjected to centrifugal forces which occur in the bends, with the danger of a product being flung out of the product container. This danger is therefore no longer a prohibitive factor in increasing the circulation speed of belt 1 if desired.

The whole process is controlled by a computer-driven control. The supplied products are first identified at a loading station 31,32, either manually by inputting product information, optionally with a hand-scanner, or automatically wherein the product passes a product scanner before or after entering a transport container 2. In both cases it is precisely known at loading station 31,32 per transport container 2 which product is located therein. Transport containers 2 are co-displaced on the drive belt 1 and then pass a series of discharge stations 41,42. These stations 41,42 each comprise an electronically controllable actuator 45, here in the form of a solenoid, which can be selectively energized by the control of the apparatus. As soon as a transport container 2 passes a discharge station 41,42 with a product intended therefor, the control will drive the relevant actuator 45 so as to carry it from a first position as shown in FIG. 9A to a second position as shown in FIG. 9B. In this second position the actuator 45 strikes against lock 60 of the locking mechanism of the passing transport container 2, whereby the tilt trays 21,22 thereof are released and the load will fall out of the transport container into a waiting dispatch box. Actuator 45 is provided on its end with a free-running wheel 46 for making contact with the locking mechanism 60 so that mutual friction and wear are limited to a minimum.

An additional discharge station 43 is provided just prior to both bends so as to discharge into one of the preceding discharge stations 41,42 all products for which no destination can be found, so that not even such a product will be co-displaced in a bend. With a view hereto, openings 28 are arranged in a carrying panel 21,22 of each transport container so that it is possible to determine whether a load is lying thereon. Arranged for this purpose under the transport path just before the additional discharge station is an optical sensor which is able to scan openings 28 and, in the case they are blocked by a load which is evidently still present, drives either directly or indirectly the actuator 45 of discharge station 43. The products which are discharged here are available for the loading stations and are collected directly in a collecting container for this purpose or discharged by means of an optionally driven conveyor belt or the like.

After passing discharge stations 41,42,43 and discharging the load at the intended destination, the transport containers 2 arrive at a resetting device 50 which causes the transport containers 2 to be returned to their closed starting position so as to be ready for a following lap in the apparatus. The resetting device here comprises a closing guide at the entry to each bend, the operation of which is shown further in FIG. 5. The closing guide comprises a gradually progressing profile which, as seen in the direction of transport, approaches the tilt axes 23 of transport containers 2. The transport containers are provided at least on their foremost tilt tray 21 with a stop protrusion with which this tray strikes against the closing guide 50 as it passes the resetting device. The tilt tray is thus gradually lifted up and eventually returned to the transporting position. Due to the mutual coupling with the other tilt tray 22, the same will apply for this latter, so that the whole transport container has been returned fully to the closed starting position at the end of the passage over the closing guide. During this process the foremost tilt tray 21 actuates the locking mechanism 60 which herein snaps closed under the tension of locking spring 63 and thus fixes trays 21,22 in the meanwhile assumed transporting position. The transport container is now ready for a following lap.

Using relatively simple means a very high sorting capacity can thus be achieved which, depending on the number of transport containers applied and the chosen circulation speed, rises in practice to the order of magnitude of 4500–9000 units per hour. Although in this case the apparatus is employed for books and magazines, the apparatus is in principle applicable for a wide range of products which may or may not be packed and can withstand the drop out of the transport container and which moreover allow easy discharge. Other applications are for instance optionally packed items of clothing and articles with relatively limited dimensions, and preferably a certain weight of their own.

Although the invention has been further elucidated above with reference to only a single embodiment, it will be apparent that the invention is by no means limited thereto. On the contrary, many more variations and embodiments are possible for the person with ordinary skill in the art within the scope of the invention. Use is thus made in the embodiment of a completely flat transport path of the transport containers, but the invention allows the bends in particular to be given a certain inclination radially so as to expose a product in the transport container to a lesser extent to the centrifugal forces occurring here. A greater bend speed, and thereby transport speed, can hereby be achieved. The track can also rotate endlessly in vertical direction instead of substantially horizontally. And the sorting capacity can also be increased by applying a pre-sorting.

Use was also made in the given embodiment of a single set of tilt trays per transport container. Use can however also be made instead of a carrying panel with multiple divisions. Here in particular a division along a central longitudinal axis is possible, so that a set of tilt trays lies on either side thereof. Through the arrangement of separate actuators and locking mechanisms for both sets of tilt trays, both can thus be operated individually, whereby the sorting capacity of the apparatus is roughly doubled. The tilt trays of both sets are preferably each coupled herein by their own coupling rod or in other manner. A power-assisting means can also be applied to the tilt trays so that they open in forced manner when unlocked. Instead of a tilting on a tilt axis directed transversely of the transporting direction, it is further possible to opt for a tilting in another direction, in particular on a pivot axis in the transporting direction.

In addition, a mutual coupling of a set of tilt trays can also be realized otherwise than with a coupling rod. It is thus possible for instance to apply on both tilt trays a radial toothing which is mutually meshing and which, when one of the trays is tilted, carries along the other tray, although a person with ordinary skill in the art will even be able to find other forms of coupling within the scope of the invention which are optimally adapted to the concrete situation. Owing to a mutual coupling of the tilt trays, in whatever form, the invention will always provide the above described advantages.

The invention claimed is:

1. Apparatus for transport and controlled discharge of a load, comprising:
   a frame with a guide for at least one displaceable transport container,
   a drive means for carrying the transport container in an endless track that is adapted to run over revolving wheels,
   the transport container being provided with a movable carrying panel for receiving a load thereon and comprising at least a first and a second tilt tray which extend between respective tilt axes located on opposite sides of the carrying panel and which can be selectively tilted between a closed transporting position and a downward hanging discharge position at any position between the revolving wheels,
   a closing mechanism that engages only the first tray, and
   a coupling between the tilt trays that imposes a tilting movement of the first tilt tray on the second tilt tray.

2. Apparatus as claimed in claim 1, wherein the coupling comprises a coupling rod which is connected to both tilt trays for pivoting eccentrically relative to the tilt axes.

3. Apparatus as claimed in claim 2, wherein the tilting movement between the transport position and the discharge position is at least partly controlled in the case of at least one of the tilt trays by a damping body.

4. Apparatus as claimed in claim 1, wherein the tilting movement between the transport position and the discharge position is at least partly controlled in the case of at least one of the tilt trays by a damping body.

5. Apparatus as claimed in claim 4, wherein the damping body comprises a shock absorber against which one of the tilt trays strikes in the discharge position.

6. Apparatus as claimed in claim 1, wherein said closing mechanism comprises a closing guide which, as an opened transport container passes, strikes against the first tray and approaches the tilt axis of the first tray.

7. Apparatus as claimed in claim 1, wherein a locking mechanism is arranged on an underside of the transport container and co-acts with at least one of the tilt trays.

8. Apparatus as claimed in claim 7, wherein said frame comprises an actuator that is selectively driven between a first position in which said actuator avoids said locking mechanism and a second position in which said actuator moves said locking mechanism to a release position that permits movement of said tilt trays to the downward hanging discharge position.

9. Apparatus as claimed in claim 1, wherein the tilt trays retain a certain mutual interspacing.

10. Apparatus as claimed in claim 1, wherein the mutual coupling of the tilt trays takes an asymmetrical form.

11. Transport container for use in the apparatus as claimed in claim 1.

12. Apparatus as claimed in claim 1, wherein said transport container has a locking mechanism and wherein said frame comprises an actuator that is selectively driven between a first position in which said actuator avoids said locking mechanism and a second position in which said actuator moves said locking mechanism to a release position that permits movement of said tilt trays to the downward hanging discharge position.

13. Apparatus for transport and controlled discharge of a load, comprising:
   a frame with a guide for at least one displaceable transport container;
   a drive means for carrying the transport container in an endless track that is adapted to run over two revolving wheels which are rotatable about substantially vertical axes;
   the transport container being provided with a movable carrying panel for receiving a load thereon and comprising at least a first and a second tilt tray which extend between respective tilt axes located on opposite sides of the carrying panel and which can be selectively tilted between a closed transporting position and a downward hanging discharge position;
   a closing mechanism that engages only the first tray; and
   a coupling between the tilt trays that imposes a tilting movement of the first tilt tray on the second tilt tray.

14. Apparatus as claimed in claim 13, wherein said closing mechanism comprises a closing guide which, as an opened transport container passes, strikes against the first tray and approaches the tilt axis of the first tray.

15. Apparatus as claimed in claim 13, wherein the tilting movement between the transport position and the discharge position is at least partly controlled by a shock absorber against which one of the tilt trays strikes in the discharge position.

16. Apparatus as claimed in claim 13, wherein said transport container has a locking mechanism and said frame comprises an actuator that is selectively driven between a first position in which said actuator avoids said locking mechanism and a second position in which said actuator moves said locking mechanism to a release position that permits movement of said tilt trays to the downward hanging discharge position.

* * * * *